US007800247B2

(12) United States Patent
Chang et al.

(10) Patent No.: US 7,800,247 B2
(45) Date of Patent: Sep. 21, 2010

(54) STORAGE SYSTEM THAT MAXIMIZES THE UTILIZATION OF RENEWABLE ENERGY

(76) Inventors: Chun-Chieh Chang, 2250 N. Triphammer Rd. H2E, Ithaca, NY (US) 14850; Olivia Pei-Hua Lee, 217 Elsmere Pl., Fort Lee, NJ (US) 07024

( * ) Notice: Subject to any disclaimer, the term of this patent is extended or adjusted under 35 U.S.C. 154(b) by 153 days.

(21) Appl. No.: 12/156,346

(22) Filed: May 30, 2008

(65) Prior Publication Data
US 2009/0295227 A1    Dec. 3, 2009

(51) Int. Cl.
*H02J 3/32*  (2006.01)
*H02J 1/10*  (2006.01)
*H02J 5/00*  (2006.01)
*H02J 7/02*  (2006.01)

(52) U.S. Cl. .............. 307/46; 307/44; 307/45; 307/48; 320/126; 320/152; 320/157

(58) Field of Classification Search .......... 307/44, 307/45, 46, 48; 320/126, 152, 157
See application file for complete search history.

(56) References Cited

U.S. PATENT DOCUMENTS

| | | | |
|---|---|---|---|
| 4,673,826 A * | 6/1987 | Masson ............... | 307/66 |
| 5,153,497 A | 10/1992 | Eiden ............... | 320/61 |
| 6,518,728 B2 | 2/2003 | Miyoshi ............... | 320/134 |
| 6,949,843 B2 | 9/2005 | Dubovsky ............... | 307/64 |
| 7,072,194 B2 | 7/2006 | Nayar et al. ............... | 363/71 |
| 7,102,251 B2 | 9/2006 | West ............... | 307/64 |
| 7,145,266 B2 | 12/2006 | Lynch et al. ............... | 307/65 |
| 7,248,490 B2 | 7/2007 | Olsen et al. ............... | 363/71 |
| 7,304,453 B2 | 12/2007 | Eaves ............... | 320/120 |
| 2003/0047209 A1 | 3/2003 | Yanai et al. ............... | 136/291 |
| 2005/0146223 A1 * | 7/2005 | Kanouda et al. ............... | 307/66 |

* cited by examiner

*Primary Examiner*—Hal I Kaplan
(74) *Attorney, Agent, or Firm*—Kratz, Quintos + Hanson, LLP

(57) ABSTRACT

An electrical energy storage system for maximizing the utilization of renewable energy. In the system an inverter connected to at least one battery module is integrated with a grid power source and home or office electrical devices. Additionally, a renewable energy source can be included in the system. A controller is used to control the components for reducing demands on the grid power source during peak demand periods and for maximizing the utilization of the renewable energy source connected to the system.

14 Claims, 10 Drawing Sheets

V = Voltage detected from battery module.
$V_H$ = One preset high voltage value that initiates the over-charge mode.
$V_L$ = One preset low voltage value that initiates the over-discharge mode.

V = Voltage detected from battery module.
$V_L'$ = One preset low voltage value that terminates the over-discharge mode.

V = Voltage detected from battery module.
$V_H'$ = One preset high voltage value that terminates the over-charge mode.

V = Voltage detected from battery module.
V" = One preset voltage value that determines how much capacity to be recharged. This voltage is designed according to the season change.

STORAGE SYSTEM THAT MAXIMIZES THE UTILIZATION OF RENEWABLE ENERGY

FIELD OF INVENTION

The present invention is concerned with energy storage systems suitable for general home and office use.

BACKGROUND OF THE INVENTION

Photovoltaics are in general connected in series or parallel as a conversion device that converts photo energy into electrical energies. Conventionally, the energy generated by the photovoltaics are either used directly as a power source or fed back into a local power grid thus reducing the load of the central power plant. Since solar energy can be generated only during the daytime, more power has to be generated by the central power plant during the nighttime, especially in the evening, in order to meet the demand for electrical energy. Nonetheless, the reliance of an inverter that converts DC power into the AC power may suffer from significant power loss owing to the instability of the DC power source (from the photovoltaics) and the phase tune problem (the consistency of AC power generated by the inverter in phase with the AC power in the grid). As a result, an efficient energy storage system is proposed for resolving the problems mentioned above.

In the present invention, an electrical storage system consists of a plurality of batteries connected in parallel integrated with one or more inverters. The inverters are independent from each other and each inverter is connected to at least one battery module being connected in parallel. The maximum power limit of an inverter is designed to be consistent with the power capacity of a battery module being connected with the inverter (e.g. same power rating limit is required for both the battery module and the inverter) thus assuring safe operation. Each inverter converts a DC source (from a battery) to AC power until a battery low voltage is reached. During a battery low voltage period, grid power is used for satisfying a users' demands until a pre-set battery charging time period (e.g. mid-night to 6:00 AM) is reached. Each inverter can be connected to a circuit breaker already installed in an office or a home. The storage system presently disclosed can be installed easily in a home or office and can be integrated with solar panels, wind turbines or other renewable energy sources for energy saving purposes that will be illustrated in later examples.

OBJECT OF THE INVENTION

It is an object of the present invention to provide a free expandable energy storage system suitable for home and office that can be used for balancing energy consumption during the day and night while allowing the integration of a renewable energy source for maximizing the energy savings.

SUMMARY OF THE INVENTION

An expandable energy storage system expandable without any further design necessary, is disclosed. The requirements and functions proposed for satisfying the compatibility and expandability of the system which includes an inverter, battery modules, and renewable energy sources are further described and demonstrated.

DESCRIPTION OF THE DRAWINGS

The invention will become more readily apparent from the following description thereof shown, by way of example only, in the accompanying drawings, wherein.

DETAILED DESCRIPTION OF THE INVENTION

The Hardware

Figure 1:
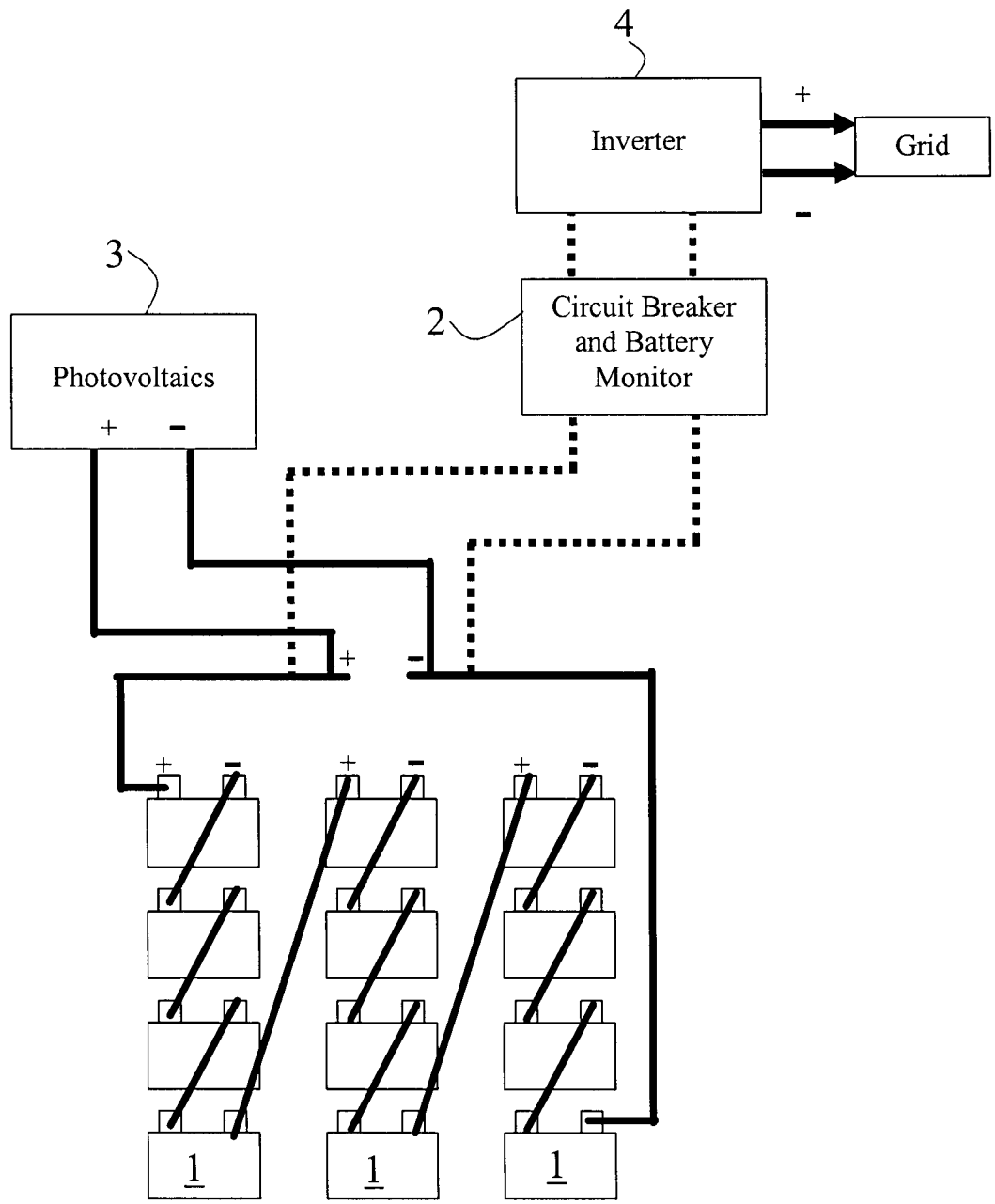
FIG. 1 shows a conventional design of an energy storage system.

A conventional design of an energy storage system is shown in FIG. 1. From FIG. 1 it can be seen that the storage is a centralized one. Owing to the high power requirements, the storage system has to be high in voltage in order to reduce the magnitude of the current and thus the heat. Disadvantages of conventional design:

1. High voltage that is potentially dangerous especially when voltage is greater than 60V.
2. Battery balance problem resulted after cycling since many batteries 1 are connected in series.
   The more batteries connected in series, the more likely for the imbalance problem becomes severe. This would affect the service life of the battery system.
3. The possibility of the electric arc formation if a circuit breaker 2 is used for terminating the current.
4. Energy storage efficiency problem unless a charge controller is installed (Owing to the I V loss caused by the voltage differences between the photovoltaics 3 and the batteries).
5. Potential inactivity of photovoltaics when numerous modules are connected in series. Failure of one of the modules connected in series would result in a great loss in conversion efficiency.
6. Expensive cost of the utilization of high power inverter 4, charge controller, battery controller (monitor), and circuit breaker (for prevention of an electric arc).

Figure 2A:
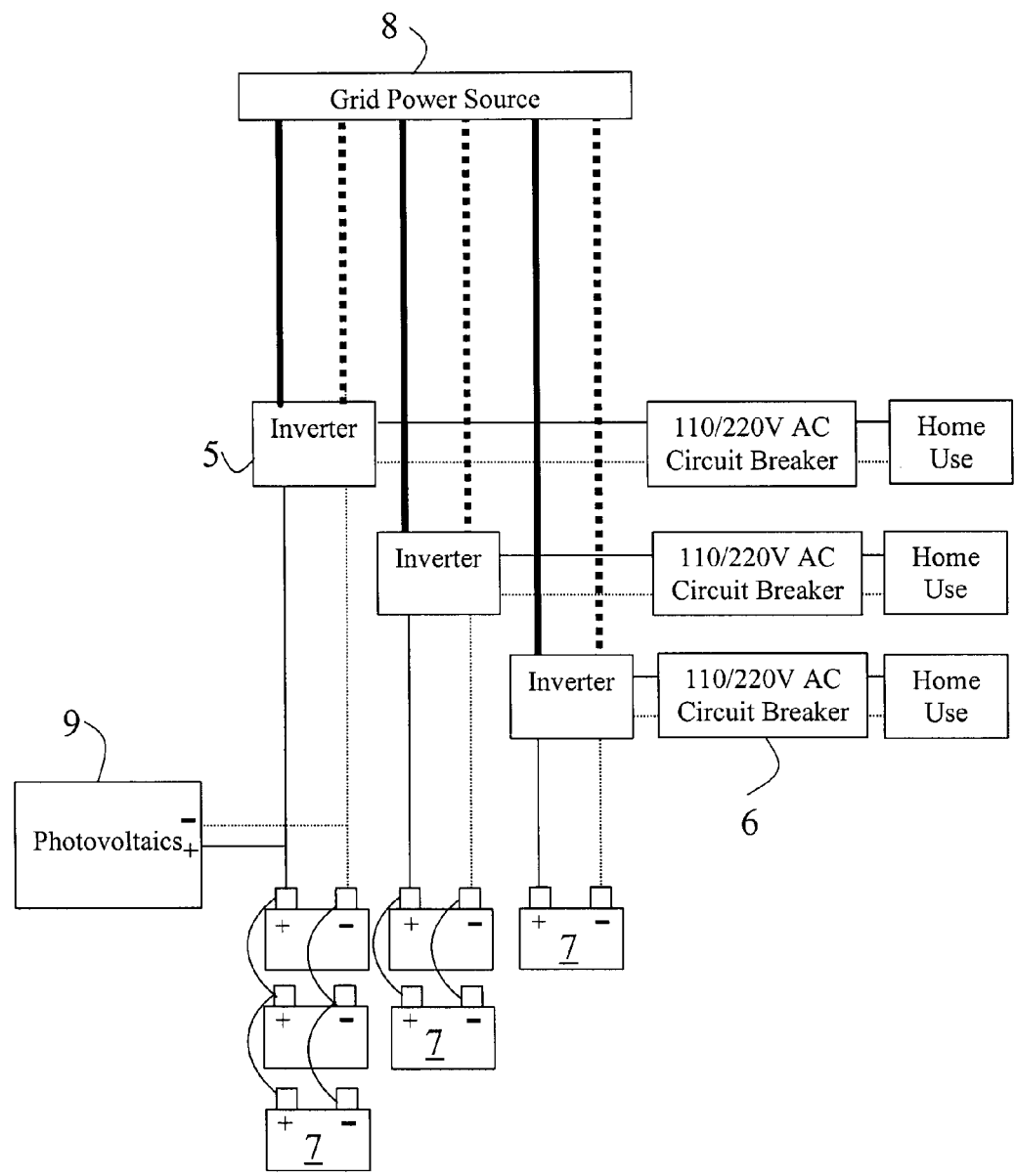
FIG. 2(a) shows a repetition of energy storage system being implemented in a home.
Figure 2B:
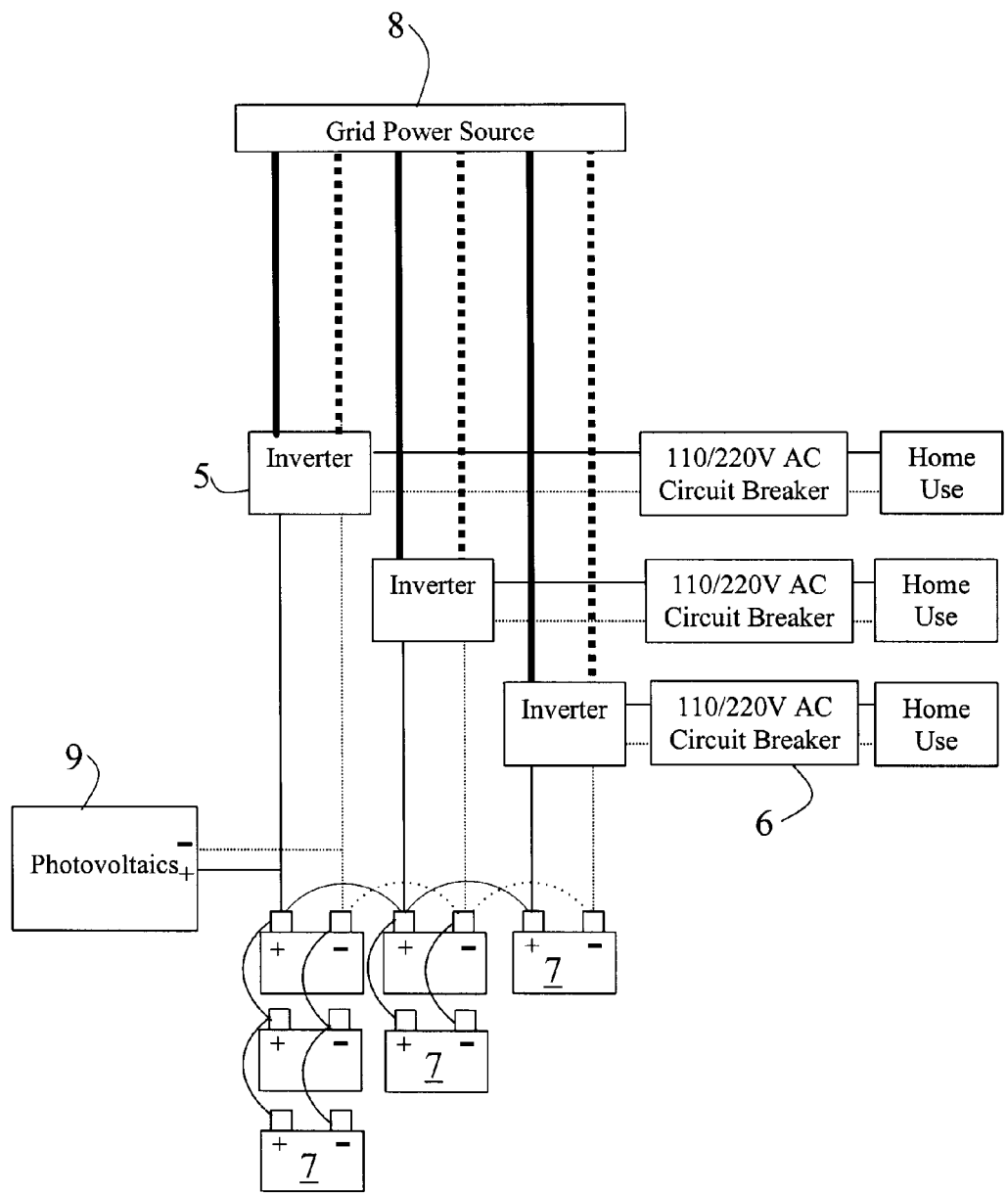
FIG. 2(b) shows a further expansion of the system shown in FIG. 2(a).

In comparison to conventional design considerations, the currently disclosed storage system consists of an inverter that is connected to at least one battery module. The maximum power limit of an inverter is designed to be consistent with the power capability of a battery module being connected with the inverter (e.g. same power rating limit is required for both the battery module and the inverter) for preventing over current operation (heating) thus assuring safety. The more battery modules being connected in parallel to the existing battery module, the safer the system. Nonetheless, the more battery modules being connected in parallel, the more cost effectiveness of the system since more renewable energy can be stored and utilized. The expandable nature of battery modules and the compatibility between the inverter, the battery modules, and the renewable energy sources (e.g. solar panels) form the basis of the present invention. FIG. 2(a) shows a repetition of energy storage system being implemented in a regular home. Each inverter 5 is connected to a circuit breaker 6 as shown in FIG. 2(a) and each inverter is connected to at least one battery module 7 that possesses the same power rating of the inverter. A further expansion of the system shown in FIG. 2(a) is shown in FIG. 2(b) with all battery modules being connected in parallel. Under an arrangement indicated in FIG. 2(b), one stipulation has to be satisfied, that is if the number of inverters 5 is N, then the number of battery modules 7 should be at least N+1. Thus, the power rating of the battery modules never reaches a condition of being lower than the peak power consumption of the inverters if one of the battery modules is malfunctioning. Meanwhile, all inverters 5 shown in FIG. 2(a) and (b) are independent from each other and each battery module 7 in parallel is exactly the same in structure thus allowing unlimited expansion of the system. As shown in FIG. 2(a) and (b), each inverter 5 converts a DC source (from battery) to AC power until a low battery voltage is reached. During the battery low voltage period, grid power 8 is connected, while disconnecting the battery power source, for satisfying users' demand until a pre-set battery charging period (e.g. mid-night to 6:00 AM) is reached. Each inverter 5 can be connected to a circuit breaker 6 already installed in an office or a home.

Advantages of the current invention include:
1. Low voltage (safer storage system).
2. Unlimited battery module expansion.
3. Connection of battery modules in parallel can reduce the battery load when one circuit is under heavy duty use (please refer to FIG. 2(b)).
4. Each circuit is independent but the battery load is centralized. Each circuit is protected with conventional (existing) circuit breakers.
5. Battery modules connected in parallel, result in low battery module maintenance cost (easy and safe for replacement) and long battery module service life expected.
6. Low cost implementation, since only small power inverters are needed.
7. Battery modules are self-controlled; no special battery monitors are needed.
8. Compatible with current home use for electrical circuits. No need for further implementation while installing this storage system (only connection change as shown in FIG. 2(a) and (b)). Since each battery module is connected to one existing circuit breaker, the compatibility is high and the safety characteristic is good.
9. Flexible for installing the system. For example, user can choose which circuit on which to install this storage system, according to their needs (refer to FIG. 2).

The Software:

The concepts utilized in this invention:
1. The storage system alone can behave as a reservoir that can delay electrical energy consumption from a central power plant from a peak demand to a valley demand thus balancing the load of the central power plant. This can be achieved by setting charging of the storage system during the energy consumption valley period only.
2. While integrating with the photovoltaics 9, the energy harvested from the photovoltaics is consumed as a first priority. Thus the reliance on the grid power is reduced. This can be achieved by setting the storage system to charge partially (e.g. 30%, depending on the expected energy harvested from the photovoltaics) during the grid energy consumption valley (e.g. between midnight and 6:00 AM).
3. While integrating with the photovoltaics, the storage system can be installed at a very low cost, as no special design is needed. The greater the capacity of the storage system installed, the less reliance on the grid power (the more self-sustainable nature). The expansion of storage capacity is easy since only parallel connection of batteries is needed.
4. Acceptance of energy from the grid is triggered only when battery capacity is drained.
5. There is no interference between the inverter, the battery module, and the solar panel.

Detailed analyses of functions and capability of the components utilized in the present invention:

Part I. The Inverter

Figure 3A:
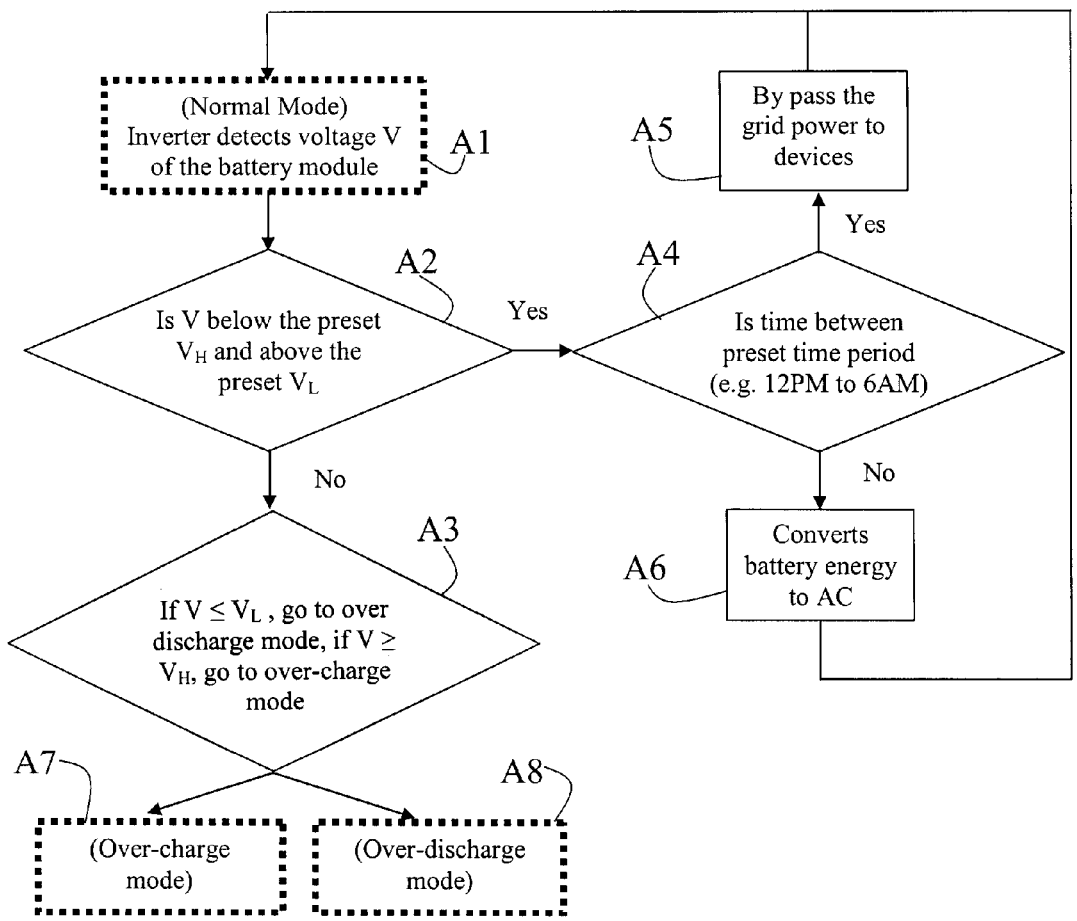
FIG. 3(a) shows the logic utilized for normal mode operation of the inverter.
Figure 3B:
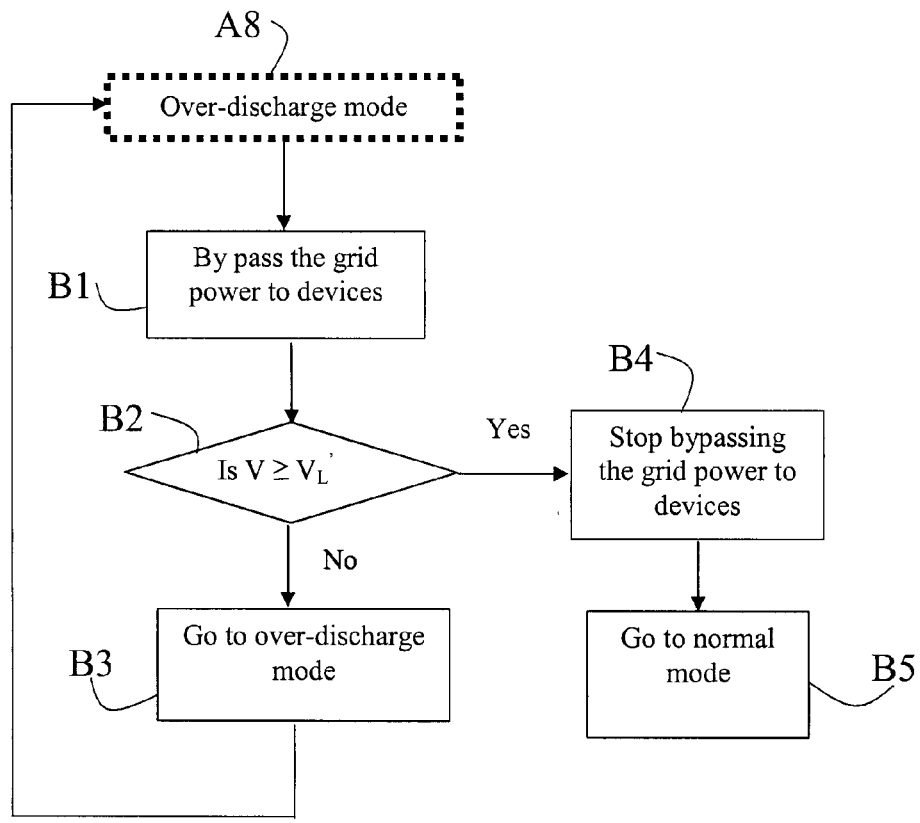
FIG. 3(b) shows the logic utilized for over-discharge mode operation of the inverter.
Figure 3C:
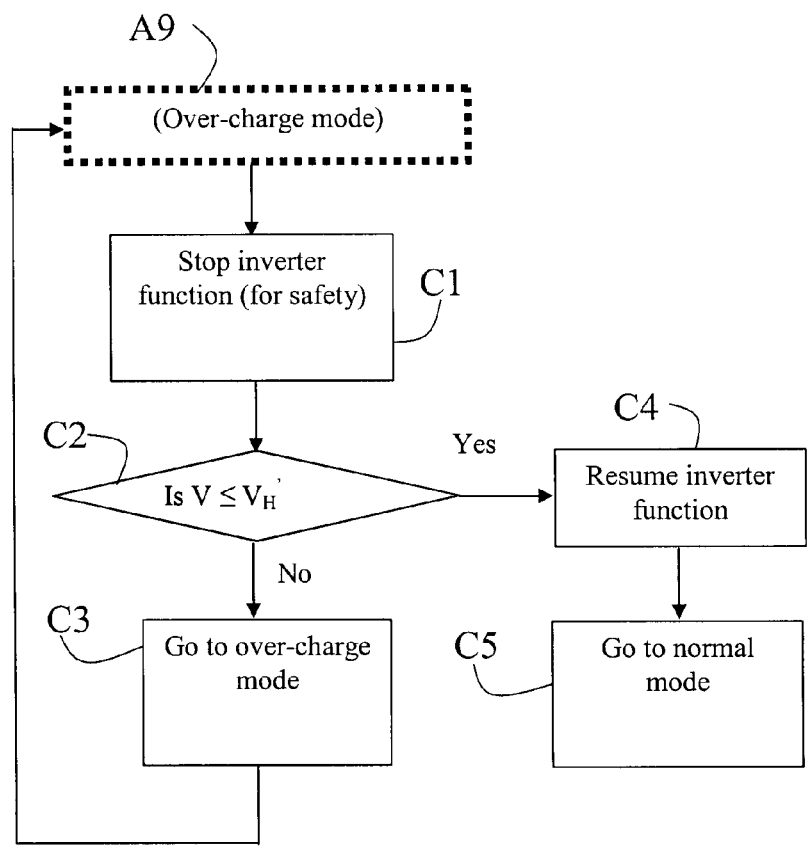
FIG. 3(c) shows the logic utilized for over-charge mode operation of the inverter.
Figure 3D:
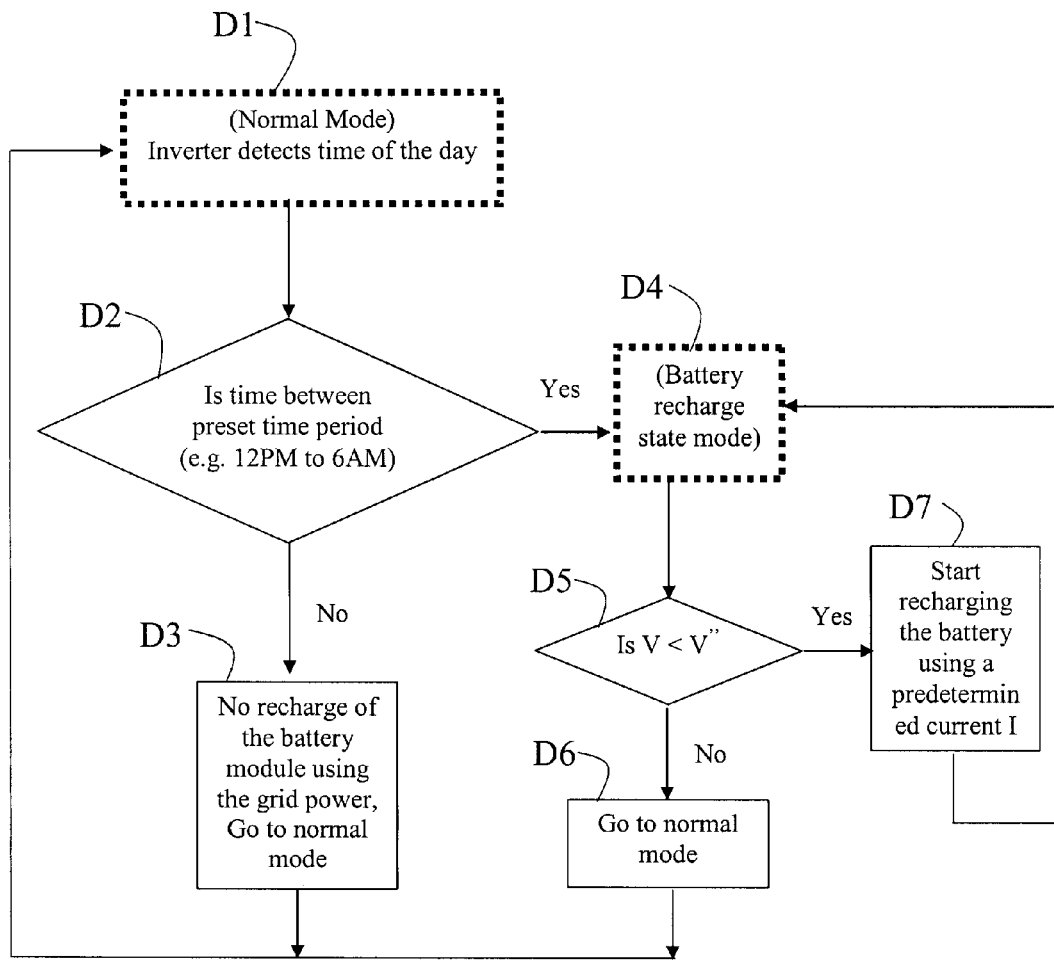
FIG. 3(d) is the logic utilized for the recharge mode operation of the inverter.
Figure 3E:
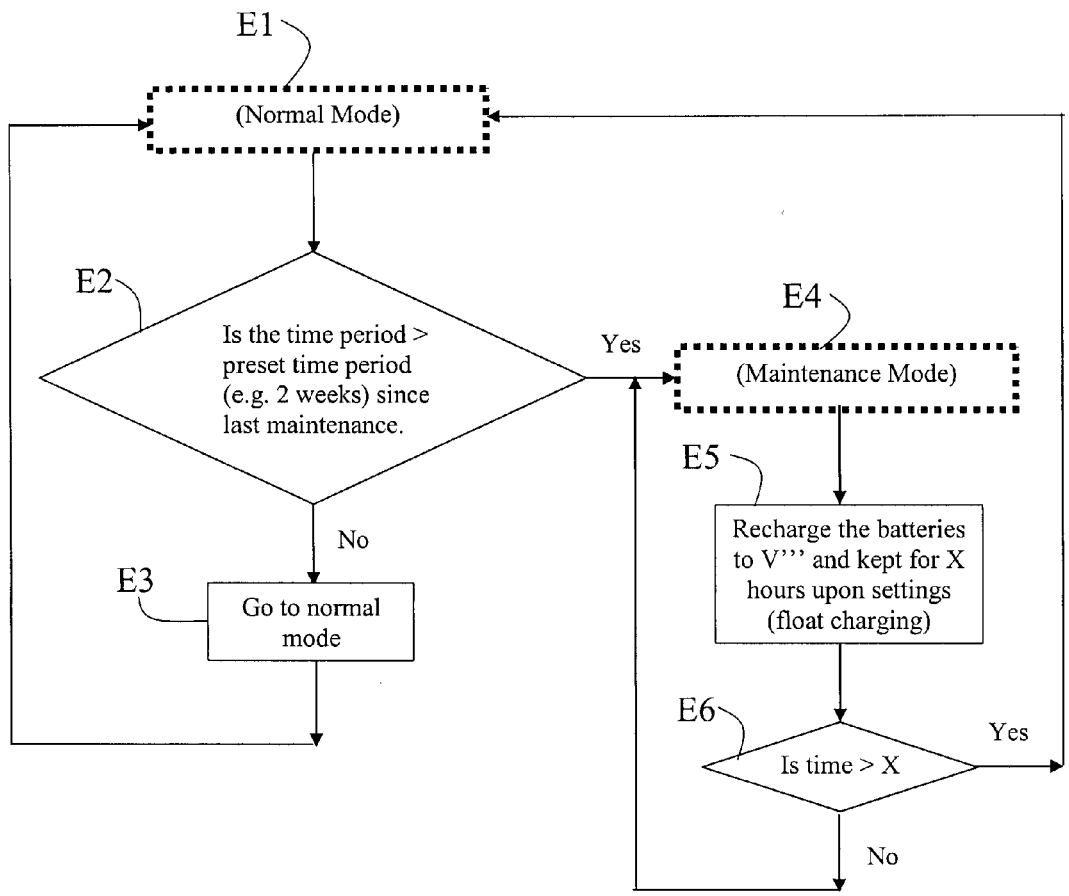
FIG. 3(e) is the logic utilized for the maintenance mode operation of the inverter.

The logic utilized for the inverter 5 is shown in FIGS. 3(a), having flow diagram boxes A1 to A8; FIG. 3(b), having flow diagram boxes A8 and B1 to B5; FIG. 3(c), having flow diagram boxes A9 and C1 to C5; and FIG. 3(d), having flow diagram boxes D1 to D7. FIG. 3(a) shows the normal mode operation of the inverter. During normal mode of operation A1, the battery energy is converted to AC at A6 before the grid energy consumption valley period (in this case it is set between 12 PM to 6 AM) is reached A4. Once the grid energy consumption valley period is reached, any consumption of electrical energy is supplied from the grid power instead of the battery power A5. During the normal mode operation, if the battery module reaches a low voltage limit A2, due to insufficient energy input from the solar energy, the inverter goes to the over-discharge mode (as shown in FIG. 3(b) at A3 and A8). During the over-discharge mode operation A8, any energy consumption from users' devices is supplied from the grid power source. At the same time, if the battery module gets enough energy through the solar panel (as indicated $V \geq V_L'$ shown in FIG. 3(b) at B2), the inverter will go to the normal mode B5 operation thus the conversion of battery energy to AC is resumed. Similarly, if the battery module reaches a high voltage limit owing to over supply of energy coming from the solar panel, the inverter will go to the over-charge mode (as shown in FIG. 3(c) at A9). During the over-charge mode operation, any energy consumption from users' devices will be delayed until a lower preset voltage $V_H'$ is reached. This prevents damage to the inverter while the power source voltage is greater than the sustainability of the inverter C1. FIG. 3(d) is the logic utilized for recharging the battery modules. The recharging of battery module can only happen during the grid energy consumption valley period. If the voltage of the battery module is higher than a preset voltage V''', no recharge is required. In contrast, if the voltage of the battery module is lower than the preset voltage V''' D5, recharge of battery module using the grid power source is conducted D7 until V''' is reached. It should be noted that V''' is adjustable according to the energy harvesting conditions of the solar panels that change from season to season. Preferably, V''' is set at the voltage corresponding to a selected empty capacity of the battery module that matches the maximum energy that could be harvested from the solar panel for the season, thus full utilization of the solar energy can be achieved. One more mode of operation is the maintenance mode E4. During this mode of operation, the inverters provide constant voltage charging at V''' to the battery modules in order to maintain the health status of the batteries E5. The logic utilized in the maintenance mode of operation is shown in FIG. 3(e), having flow diagram boxes E1 to E6.

Part II. The Battery Module

In order to enhance the "easy (low cost) for maintenance" and satisfy the "flexibility (allows wide range of solar system or even wind system)" characteristics of the storage system, a cell protection controller is placed inside each battery module. The controller monitors the voltage of each battery connected in series which make up a battery module. When the controller detects a low voltage ($V_{BL}$) or a high voltage ($V_{BH}$) of any of the batteries connected in series, the controller sends a signal for blocking the power input/output using a means such as a relay. Under an over-charge condition, the relay is open until a lower voltage $V_{BH}'$ is reached. In contrast, under an over-discharge condition, the relay is open until a "resume" button is pushed manually (or simply replace the battery module). During the over-discharge condition, a beeper sound or a blinking LED light signal can be generated for calling attention to the abnormal condition. In general, the inverter will trigger the "over-discharge" mode before the battery low condition generated in the battery modules. In the present invention, lithium iron phosphorous oxide (LiFexPyOz) type of lithium ion battery is a preferred battery type. With the use of the lithium iron phosphorous oxide batteries, the high voltage limit set ($V_{BH}$) is preferred to be 4.0V and the low voltage limit set ($V_{BL}$) is preferred to be 2.0V. In general, the battery low voltage limit will not be reached when the inverter is functioning (i.e. the inverter reaches $V_L$ before $V_{BL}$ is met). However, the battery high voltage limit $V_{BH}$ may be reached before the inverter high voltage limit $V_H$ is met (please also refer to section Part III). The controller embedded in each battery module provides two major functions: (1) Assume one battery module consists of a four batteries in series configuration and assume the battery module is kept at 13.4V (same as other battery modules since all modules are connected in parallel as shown in FIGS. 2(a) and 2(b)). While one of the batteries is internally shorted (short inside the battery itself), the voltage drop of one of the batteries in series will trigger the relay "open" thus preventing other battery modules (same kept at 13.4V) from charging the one (module) that has a defective battery inside. (2) With the use of a beeper sound function, a user can be aware of the integrity of the battery modules by judging the frequency of the beeper sound generation. Until this point, several aspects can be concluded:
  1. The battery modules and the inverters are independent (no communications are necessary between the battery module controller and the inverter).
  2. The limits and modes are designed compatible between the inverter and the battery modules.
  3. The storage system can be self-sustainable with inverters and battery modules alone without a renewable energy source. This storage system alone is good for applications such as delaying the peak grid energy consumption to the valley energy consumption period.

As details described in Part I and Part II, the compatibility between battery modules and the inverter is assured. All modes introduced in the inverter are controlled in a way that meets the requirements and functions of the battery modules and vice versa. Even if the battery module output is shut down by a relay owing to over discharge of the battery module, the inverter will detect as "low voltage" and go to the over-discharge mode until the battery module is "resumed manually" or "replaced with a new battery module". Until this point, the stand alone nature and compatibility issues are satisfied.

Part III. Integration of Storage System (the Battery Modules and the Inverters) Together with Other Power Sources such as Solar Panels.

Figure 4:
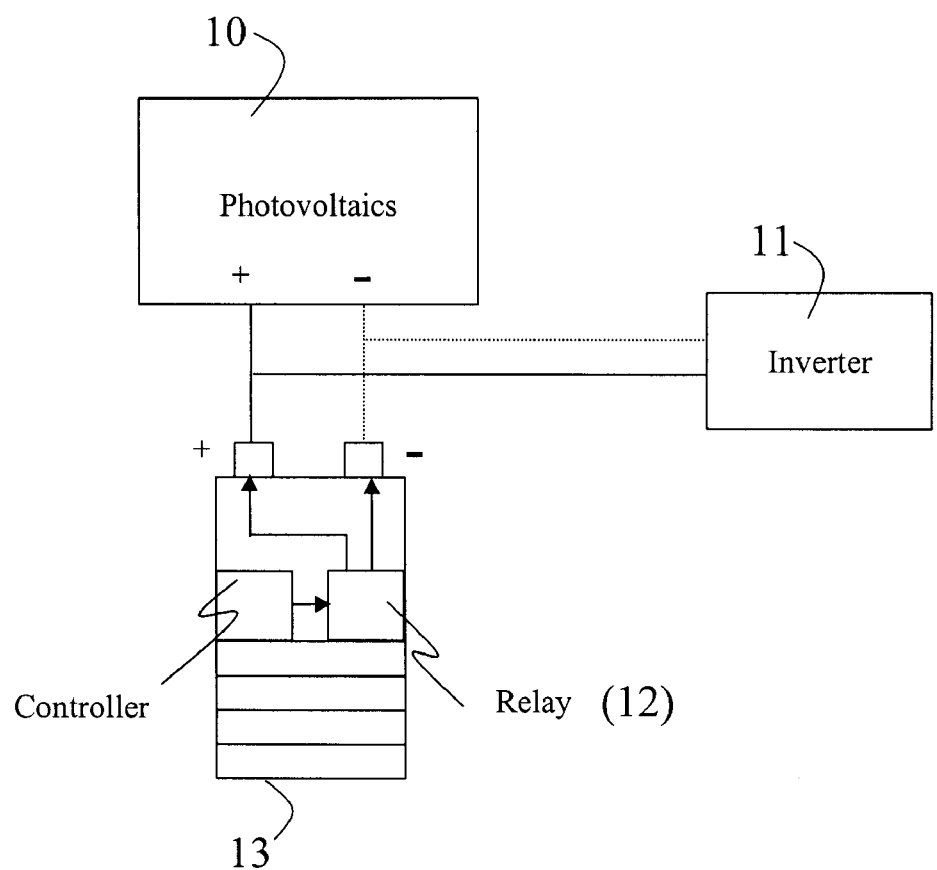
FIG. 4 shows a schematic representation of the integration of the storage system with a solar panel.

When integrating the storage system with renewable energy source such as solar panels, one more issue is considered and analyzed below:

1. The Over Charge Condition:

While solar panel output is greater than the consumption of energy from the inverter, a battery full condition may be reached. This could happen when battery energy stored is not consumed regularly for consecutive days and it leads to the battery full condition. Under such condition, the battery module may be overcharged and trigger the relay "open" action. When the relay is open, the battery to solar panel output connection is disconnected and the connection between solar panel and the inverter remains active, as shown in FIG. 4. A schematic representation of the integration of the storage system with a solar panel 10 is shown in FIG. 4. According to FIG. 4, the solar panel 10 and the inverter 11 are connected directly in front of the relay 12. During normal conditions, the solar panel, the battery module 13, and the inverter are interconnected. When a battery module is over charged, the relay will be "open" thus only the solar panel and inverter are interconnected. While the battery relay is "open", at this instance, the inverter may have already reached the "over-charge mode". If the voltage detected by the inverter is still below the "over-charge mode" condition, the inverter will keep working until the "over-charge mode" condition is reached (stop inverter function for protecting the inverter). The later case is more likely to happen since $V_H$ is usually set at 16V and $V_{BH}$ is set at 4.0V. For a four battery in series condition, 4.0V for one battery is most likely to be reached before 16V is reached. The inverter function is resumed if the voltage of the solar panel comes back to normal (when $V \leq V_H'$, normal condition is met). Similarly, the battery module function can be resumed when the voltage of the battery module comes back to normal operation (when $V \leq V_{BH}'$ is met). This overcharge condition is applicable to the expanded system (as shown in FIG. 2(a) and (b)) with multiple battery modules and inverters as well. In a multiple battery module system, if the solar panel output is steady, the battery modules will be charged to full capacity with one or more relays "open". While one or more relays are open, the inverter(s) may still work until "over-charge mode" is reached or still work normally until relays in the battery modules come back to "close" status.

The overcharge condition analyzed in this section explains the superiority of the compatibility between the storage system disclosed in the present invention and other renewable energy sources. Conclusions can be drawn as follows:
  1. The solar panels, battery modules, and the inverters are independent (no communication is necessary between the solar panel, battery module controller, and the inverter).
  2. The compatibility between the inverter, the battery modules, and the renewable energy source is guaranteed.
  3. The storage system is available for other power source input such as solar panels or wind energies.
  4. The ready to expand nature of the system (trouble free with direct expansion).

The parameters indicated in the specifications for both the inverter and battery modules are appropriate for a four lithium iron phosphorous oxide (LiFexPyOz) materials system battery in series residing in one battery module as an example. It should be noted that one battery module can consist up to 16 batteries in series. However, repetition of controllers and relays would be necessary as indicated in Table I. Table I is a list of parameters appropriate for up to 16 battery in series in a battery module. Each module can be connected in parallel for conducting the present invention.

TABLE I

Parameters suitable for inverters and battery modules

|  | 4 in series | 8 in series | 12 in series | 16 in series |
|---|---|---|---|---|
| Inverter parameters: | | | | |
| $V_H$ | 16 | 32 | 48 | 64 |
| $V_H'$ | 15 | 30 | 45 | 60 |
| $V_L$ | 10.5 | 21 | 31.5 | 42 |
| $V_L'$ | 12.5 | 25 | 37.5 | 50 |
| V''' | 12.8 | 25.6 | 38.4 | 51.2 |
| V'''' | 14.6 | 29.2 | 43.8 | 58.4 |
| Battery module parameters: | | | | |
| $V_{BH}$ | 4 | 4 | 4 | 4 |
| $V_{BH}'$ | 3.5 | 3.5 | 3.5 | 3.5 |
| $V_{BL}$ | 2 | 2 | 2 | 2 |
| Module units | 1 | 2 | 3 | 4 |

*"Modules units" represent the repetition of components (the relays and controllers etc). For example, a 16 in series system consists of 4 controllers and 4 relays.

The number of controllers and relays residing in a battery module disclosed in the present invention (as shown in Table I) does not limit the appropriateness of the battery module being connected with the inverter and the solar panel or the expandable nature of the repetition of battery modules being connected in parallel. For example, a 16 in series battery module may contain only one controller and one relay depending on the availability of controllers and relays. However, the $V_{BH}$, $V_{BH}'$, $V_{BL}$, the control of relay open/close, the activities of the battery module possesses when $V_{BH}$, $V_{BH}'$, $V_{BL}$ are met, and the configurations shown in FIG. 4 are always important for rendering the system to work properly.

Example I

PVs (photovoltaics) Integrated With Storage System Mimicking Family Use Conditions in a Home In the present example, several assumptions are made for mimicking family use conditions in a home:
1. No electrical energy consumption during 8 AM to 6 PM.
2. A constant power consumption of 800 W (using bulbs) is conducted between 6 PM to 12 PM (6 hours duration).
3. A 30V OCV photovoltaics (750 W) is installed for converting photo energy into electrical energy.
4. A 2.2 kW (110V, 20 A max) inverter is used for mimicking one electrical circuit being used by a typical family. The inverter is preset to charge the battery during 12 PM to 6 AM to 30% of battery capacity.
5. Parameters set for the inverter includes:
   a. $V_H$=32V, $V_L$=21V,
   b. $V_H'$=30V, $V_L'$=25V,
   c. V'''=25.6V, V''''=29.2V
   d. Recharge mode current=25 A
6. A 10 kWh battery pack using lithium iron phosphorous oxide (LiFexPyOz) lithium ion battery (26.2V, 8 batteries in series, 400 Ah in capacity) is utilized in the present example. A power capability of the battery is 30 kW (equivalent to a 3 C power rating, that is complete drainage of the battery in 20 minutes). A 3 C power rating is known in the art as a measure of a battery's performance. An initial charge of 60% capacity is kept in the storage system. If the capacity is less than 30%, the storage system will be recharged to 30% of battery capacity between 12 PM to 6 AM. The battery voltage limits are set as $V_{BH}$ is 4.0V, $V_{BL}$ is 2.0V.

Figure 5:
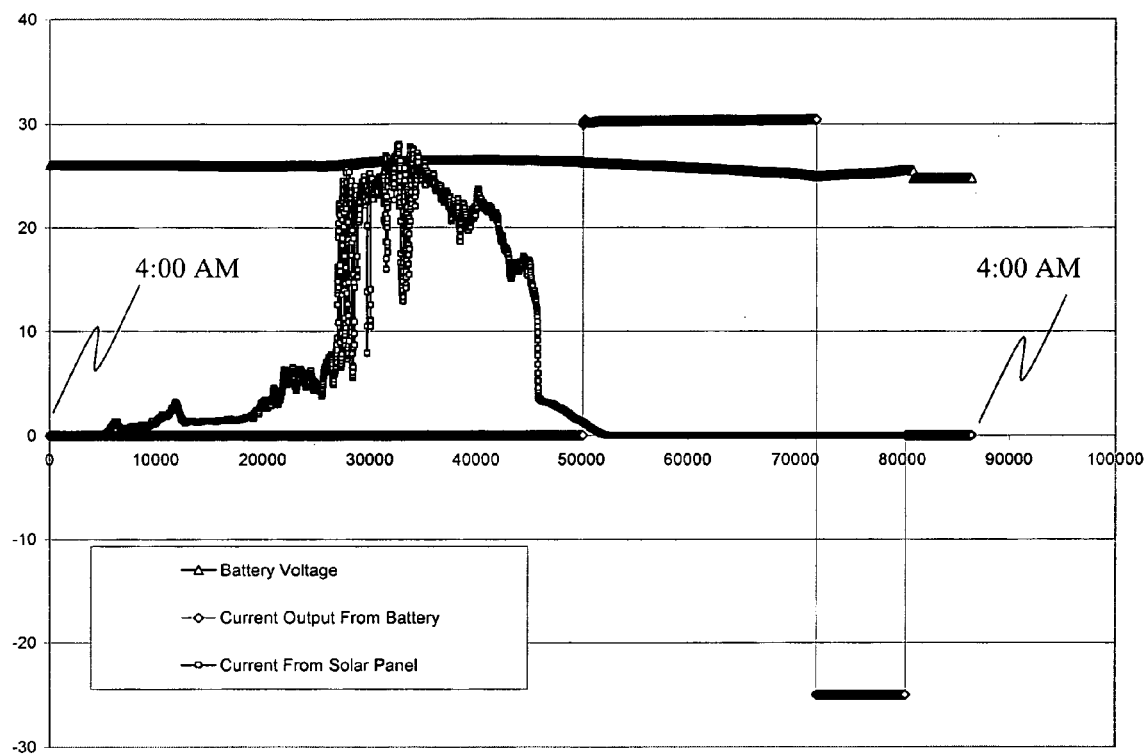
FIG. 5 shows the typical I, V curve versus time for 24 hours (from 4:00 AM of one day to 4:00 AM of the next day).

Results:

Case I. During a Sunny Day:
The I, V curve versus time for 24 hours (from 4:00 AM of one day to 4:00 AM of the next day) is shown in FIG. 5. The energy data shown in FIG. 5 is the integration of the current (solar panel or battery), time, and the battery voltage.

By integrating the I, V, and time, the energy stored and delivered are listed in Table II.

TABLE II

Cost Saving Characteristics of The Energy Storage System During Sunny Day

| | |
|---|---|
| Energy input between 8 AM to 6 PM | 3.4 kWh |
| Energy output between 6 PM to 12 PM | 4.8 kWh |
| Energy input between 12 PM to 6 AM | 1.4 kWh (To keep 30% of capacity) |
| Energy saved | 4.8 − 1.4 = 3.4 kWh |
| Amount saved with PV and storage system* | 0.41$USD |
| Amount saved with PV only[§] | 0.34$USD |

*The amount saved is calculated by assuming the price before 12 PM is 0.1 $USD/kWh, after 12 PM is 0.05 USD/kWh. The saving based on the presence of both PV and storage system is calculated as follows:
1. Without storage system and photovoltaics, the cost of energy consumption is: 4.8 * 0.1 = 0.48$USD
2. Savings with storage system and photovoltaics by calculating the price of energy input required from the grid: 1.4 * 0.05 = 0.07$USD
3. Total saving: 0.48 − 0.07 = 0.41$USD
[§]The saving based on the presence of PV only (assuming 100% conversion to grid) is calculated as follows:
1. Without storage system and photovoltaics, the cost of energy consumption is: 4.8 * 0.1 = 0.48$USD
2. Saving with photovoltaics only by calculating the price of net energy input required from the grid: (4.8 − 3.4) * 0.1 = 0.14$USD
3. Total saving: 0.48 − 0.14 = 0.34$USD Case I. During a Cloudy Day:
Similar to case I, one example of the energy stored and delivered during a cloudy day is shown in Table III.

TABLE III

Cost Saving Characteristics of The Energy Storage System During Cloudy Day

| | |
|---|---|
| Energy input between 8 AM to 6 PM | 1 kWh |
| Energy output between 6 PM to 12 PM | 4.8 kWh |
| Energy deficit (input from grid) between 6 PM to 12 PM | 0.8 kWh |
| Energy input between 12 PM to 6 AM | 3 kWh (To keep 30% full in capacity) |
| Energy saved | 1 kWh |
| Price saved with PV and storage system* | 0.25$USD |
| Price saved with PV only[§] | 0.1$USD |

*The saving based on the presence of both PV and storage system is calculated as follows:
1. Without storage system and photovoltaics, the cost of energy consumption is: 4.8 * 0.1 = 0.48$USD
2. Saving with storage system and photovoltaics by calculating the price of energy input required from the grid: 0.8 * 0.1 + 3 * 0.05 = 0.23$USD
3. Total saving: 0.48 − 0.23 = 0.25$USD
[§]The saving based on the presence of PV only (assuming 100% conversion to grid) is calculated as follows:
1. Without storage system and photovoltaics, the cost of energy consumption is: 4.8 * 0.1 = 0.48$USD
2. Saving with photovoltaics only by calculating the price of net energy input required from the grid: (4.8 − 1) * 0.1 = 0.38$USD
3. Total saving: 0.48 − 0.38 = 0.1$USD

CONCLUSIONS

1. The system is fully automated without manual operations.
2. Maximum savings can be achieved only when energy consumed is less than the energy harvested from the photovoltaics.
3. Without the energy storage system, the price saved with PV increases with the energy harvested from the PV.
4. With the energy storage system, the price saved can be even more compared to when PVs are used alone owing to the price difference between the grid energy consumption peak and valley.

The invention claimed is:

1. An energy storage system, comprising a plurality of battery modules, electrically connected in parallel, each plurality of battery modules having an inverter electrically connected thereto to form a plurality of battery modules and inverter combination, the inverter having an AC output connected to one or more energy consuming devices and an AC input connected to a power grid,
   each battery module of said plurality of battery modules having electrical properties similar to the remaining battery modules, and
   each of the battery module having a maximum power output rating equal to or greater than a continuous maximum output power rating of the inverter, wherein
   the plurality of battery modules and inverter combination is controlled to be in one of system control modes, said system control modes comprising:
   1) an over-charge mode, wherein if a voltage detected from said battery module V is >a sustainable high voltage limit $V_H$ of the inverter, than then the inverter function is abandoned until a lower voltage limit $V_H'$ is reached;
   2) an over-discharge mode, wherein if V<a preset voltage $V_L$, than then the inverter is disconnected from the plurality of battery modules and the AC input of the inverter connected to the grid AC power source is connected, while disconnecting the battery power source, to the one or more energy consuming devices;
   3) a recharge mode, wherein if V<a preset voltage V″ and if the time of day T is within a preset range R, then the plurality of battery modules is recharged from the inverter AC input connected to the power grid; and
   4) a normal operating mode, wherein if V is $V_H$ and if V is $\geq V_L$ and if T is not in the range R then the plurality of battery modules is connected to the inverter for providing energy through the inverter AC output to the one or more energy consuming devices.

2. The energy storage system of claim 1, further comprising
   a maintenance mode, wherein if a period of time that has passed since being in the maintenance mode is a preset period of time, then the inverter provides a constant voltage charging at a voltage V‴ to the plurality of battery modules for a preset period of time.

3. The energy storage system of claim 1, wherein
   each battery module has therein at least one controller for monitoring the voltage of battery cells of the battery module.

4. The energy storage system of claim 1, wherein
   each battery module has therein a relay for disconnecting the battery module.

5. The energy storage system of claim 1, wherein
   each battery module has therein at least one means for disconnecting the battery module from the remaining battery modules and the inverter when the batteries is in the over-charge state V>$V_{BH}$ or over-discharge state V<$V_{BL}$ where $V_{BH}$ is the battery over-charge voltage and $V_{BL}$ is the battery over-discharge voltage.

6. The energy storage system of claim 5, wherein
   each battery module has therein at least one means for reconnecting the battery module to the remaining battery modules and the inverter when the batteries exceeds the over-charge limit V>$B_H$ then followed by the condition of when V<$V_{BH}'$ where $V_{BH}'$ is a normal battery working voltage.

7. The energy storage system of claim 1, wherein each battery module when in an over-discharge state provides a visual or audible signal.

8. The energy storage system of claim 1, wherein
   the inverter has a continuous power output in a range of 2 kW to 3 kW, and each battery module has a capacity range of 5 kWh to 10 kWh and an output voltage of 100 volts.

9. The energy storage system of claim 1, wherein
   the inverter has a continuous power output in a range of 2 kW to 3 kW, and each battery module has a capacity range of 1 kWh to 10 kWh and an output voltage of 60 volts.

10. The energy storage system of claim 1, further comprising
    a renewable energy source connected to the plurality of battery modules.

11. The energy storage system of claim 1, wherein
    the inverter is disconnected from the plurality of battery modules with use of a relay.

12. The energy storage system of claim 1, wherein
    the battery modules comprise Lithium Iron Phosphorous Oxide battery cells.

13. A combined energy storage system, comprising
    a plurality of the energy storage systems of claim 1, wherein the plurality of battery modules of each energy storage system of claim 1 are connected in parallel to the plurality of battery modules of each other energy storage system of claim 1, and the number of battery modules is at least at least N+1 where N is the number of inverters.

14. An energy storage system, comprising
    a battery module, each battery module having an inverter electrically connected thereto to form a battery module and inverter combination, the inverter having an AC output connected to one or more energy consuming devices and an AC input connected to a power grid,
    the battery module having a maximum power output rating equal to or greater than a continuous maximum output power rating of the inverter, wherein
    the battery module and inverter combination is controlled to be in one of system control modes, said system control modes comprising:
    1) an over-charge mode, wherein if a voltage detected from said battery module V is >a sustainable high voltage limit $V_H$ of the inverter, then the inverter function is abandoned until a lower voltage limit $V_H'$ is reached;

2) an over-discharge mode, wherein if V<a preset voltage $V_L$, then the inverter is disconnected from the battery module and the AC input of the inverter connected to the grid AC power source is connected, while disconnecting the battery power source, to the one or more energy consuming devices;

3) a recharge mode, wherein if V<a preset voltage V" and if the time of day T is within a preset range R, then the battery module is recharged from the inverter AC input connected to the power grid; and 4) a normal operating mode, wherein if V is $\leq V_H$ and if V is $\geq V_L$ and if T is not in the range R then the battery module is connected to the inverter for providing energy through the inverter AC output to the one or more energy consuming devices.

* * * * *